United States Patent
Yun

(10) Patent No.: US 11,205,779 B2
(45) Date of Patent: Dec. 21, 2021

(54) ELECTRODE FOR LITHIUM SECONDARY BATTERY COMPRISING PROTECTIVE LAYER AND LITHIUM SECONDARY BATTERY COMPRISING THE SAME

(71) Applicant: LG CHEM, LTD., Seoul (KR)

(72) Inventor: Hyunwoong Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 187 days.

(21) Appl. No.: 16/344,478

(22) PCT Filed: Jul. 30, 2018

(86) PCT No.: PCT/KR2018/008644
§ 371 (c)(1),
(2) Date: Apr. 24, 2019

(87) PCT Pub. No.: WO2019/027210
PCT Pub. Date: Feb. 7, 2019

(65) Prior Publication Data
US 2020/0058942 A1      Feb. 20, 2020

(30) Foreign Application Priority Data

Aug. 1, 2017 (KR) .................. 10-2017-0097465
Jul. 27, 2018 (KR) .................. 10-2018-0088205

(51) Int. Cl.
| | |
|---|---|
| H01M 4/62 | (2006.01) |
| H01M 10/653 | (2014.01) |
| H01M 4/38 | (2006.01) |
| H01M 4/36 | (2006.01) |
| H01M 4/134 | (2010.01) |
| H01M 10/052 | (2010.01) |

(52) U.S. Cl.
CPC .......... *H01M 4/628* (2013.01); *H01M 4/134* (2013.01); *H01M 4/366* (2013.01); *H01M 4/382* (2013.01); *H01M 4/622* (2013.01); *H01M 10/052* (2013.01); *H01M 10/653* (2015.04)

(58) Field of Classification Search
None
See application file for complete search history.

(56) References Cited

U.S. PATENT DOCUMENTS

| | | | |
|---|---|---|---|
| 5,314,765 A | 5/1994 | Bates | |
| 2014/0295263 A1 | 10/2014 | Iwama et al. | |
| 2016/0093922 A1* | 3/2016 | Endo ................ | H01M 10/0525 |
| | | | 429/233 |
| 2016/0344067 A1 | 11/2016 | Laramie et al. | |
| 2018/0053930 A1* | 2/2018 | Zhamu .................. | H01M 4/133 |
| 2020/0119362 A1* | 4/2020 | Furusawa ............. | H01M 4/131 |

FOREIGN PATENT DOCUMENTS

| | | |
|---|---|---|
| JP | 2006-351326 A | 12/2006 |
| JP | 2008-103344 A | 5/2008 |
| JP | 2010-160984 A | 7/2010 |
| JP | 2014-191912 A | 10/2014 |
| JP | 2015-2008 A | 1/2015 |
| JP | 2015-56208 A | 3/2015 |
| JP | 2015056208 A * | 3/2015 |
| KR | 10-0425585 B1 | 4/2004 |
| KR | 10-2014-0083024 A | 7/2014 |
| KR | 10-1486130 B1 | 1/2015 |
| KR | 10-2015-0101808 A | 9/2015 |
| WO | WO 2013/055573 A1 | 4/2013 |

OTHER PUBLICATIONS

"Boron Nitride, BN Ceramic Properties", Accuratus internet printout, 2013, https://www.accuratus.com/boron.html (Year: 2013).*
International Search Report (PCT/ISA/210) issued in PCT/KR2018/008644, dated Feb. 18, 2019.

* cited by examiner

*Primary Examiner* — Tracy M Dove
(74) *Attorney, Agent, or Firm* — Birch, Stewart, Kolasch & Birch, LLP

(57) ABSTRACT

An electrode for a lithium secondary battery including a protective layer, and a lithium secondary battery including the same. The protective layer contains a thermally conductive material. The electrode for the lithium secondary battery maintains uniform heat distribution on a surface of the electrode during charging and discharging, so that lithium dendrites grow uniformly on the surface. Accordingly, the electrode does not cause a problem of an increase in contact area between the electrode and an electrolyte by the non-uniform growth of the lithium dendrites, or a problem of peeling of the protective layer, thereby improving stability and lifetime characteristics when applied to the battery.

9 Claims, No Drawings

ELECTRODE FOR LITHIUM SECONDARY BATTERY COMPRISING PROTECTIVE LAYER AND LITHIUM SECONDARY BATTERY COMPRISING THE SAME

TECHNICAL FIELD

Cross-Reference to Related Applications

This application claims the benefits of Korean Patent Application No. 10-2017-0097465 filed on Aug. 1, 2017 and No. 10-2018-0088205 filed on Jul. 27, 2018 with the Korean Intellectual Property Office, the disclosures of which are incorporated herein by reference in their entirety.

The present disclosure relates to an electrode for a lithium secondary battery including a protective layer, and a lithium secondary battery including the same.

BACKGROUND OF ART

With the rapid development of electronics, communication, and computer industries, an application field of energy storage technology is expanded to camcorders, cellular phones, laptops, personal computers (PC), and electric vehicles. Accordingly, studies have been made on a small secondary battery which is light and long-lasting, and has high reliability and high performance.

Among the currently available secondary batteries, lithium secondary batteries developed in the early 1990s are attracting attention because of their high operating voltage and energy density.

Lithium metal, a carbon-based material, silicon, and the like are used as a negative electrode active material of the lithium secondary battery, and the lithium metal has an advantage of obtaining the highest energy density such that research is being continuously carried out on it.

However, the lithium metal reacts with moisture in the air to form by-products such as LiOH, $Li_2O$, and $Li_2CO_3$. In addition, when the lithium metal is exposed to an electrolytic solution, a resistive material is generated, which significantly lowers the performance of a produced battery and may cause an internal short circuit.

In addition, when the lithium metal electrode is used, dendrites are formed on a surface of the lithium metal during charging and discharging of the battery, which should be solved in order to improve the performance and stability of the battery.

Accordingly, various methods for improving the stability of the lithium metal electrode have been proposed. As one of them, a method of forming a protective layer at a position contacting with an electrode has been proposed.

For example, in Korean Patent Registration No. 10-0425585, it is mentioned that when a cross-linked polymer protective thin film is formed on a surface of a lithium electrode using a diacryl-based monomer represented by $CH_2=CH-CO_2-(CH_2)_8-CO_2-CH=CH_2$ to improve interfacial characteristics between the lithium metal electrode and a polymer electrolyte, lifetime of the battery can be increased.

However, even if the protective layer is applied as described above, the protective layer may peel off from the electrode surface due to driving of the battery, and a preventing effect of the lithium dendrite growth cannot be sufficiently secured. This is because precipitation and dissolution of the lithium metal do not occur uniformly on the surface of the electrode during charging and discharging of the battery, and the lithium dendrites grow non-uniformly to make a volume change of the electrode extreme. Further, when the lithium dendrite grows non-uniformly in this manner, there arises a problem that side reactions with an electrolyte increase due to an increase of a surface area of the electrode.

Therefore, it is necessary to develop a new electrode protective layer capable of inducing uniform growth of the lithium dendrite in order to secure stability and lifetime characteristics of the electrode containing lithium metal.

PRIOR ART DOCUMENTS

Patent Document 1: Korean Patent Registration No. 10-0425585, "Lithium polymer secondary battery having crosslinked polymer protective thin film and method for manufacturing the same"

DETAILED DESCRIPTION OF THE INVENTION

Technical Problem

The present inventors performed studies on a new electrode protective layer capable of inducing uniform growth of lithium dendrites on a surface of an electrode in order to improve stability and lifetime characteristics of the electrode containing lithium metal as an electrode active material, thereby completing the present invention.

Therefore, the present disclosure is to provide an electrode for a lithium secondary battery including a new protective layer.

In addition, the present disclosure is to provide a lithium secondary battery including the electrode.

Technical Solution

In order to achieve the above object, the present disclosure provides an electrode for a lithium secondary battery, including:
  a current collector;
  a protective layer on the current collector; and
  optionally an electrode active material layer interposed between the current collector and the protective layer and containing lithium metal,
  wherein the protective layer includes a thermally conductive material having thermal conductivity of 25 to 500 W/m·K, and
  the thermally conductive material is contained in an amount of 50 wt % or more of a total weight of the protective layer.

Preferably, the thermally conductive material may have thermal conductivity of 100 to 500 W/m·K.

The thermally conductive material may be a thermally conductive ceramic, and the thermally conductive ceramic may include at least one selected from the group consisting of boron nitride, magnesium oxide, aluminum oxide, beryllium oxide, aluminum nitride, stearate, and forsterite.

The thermally conductive ceramic may be made of particles having a particle size of 0.1 to 10 μm.

The protective layer may contain 70 wt % or more of the thermally conductive material.

The protective layer may include at least one binder resin selected from the group consisting of polyvinylidene fluoride (PVDF), polyvinyl alcohol (PVA), polyacrylic acid (PAA), poly(methacrylic acid) (PMA), poly(methylmethacrylate) (PMMA), polyacrylamide (PAM), poly(methacrylamide), polyacrylonitrile (PAN), polymethacrylonitrile, and polyimide (PI).

The protective layer may have a thickness of 1 to 10 μm.

The current collector may have a thickness of 5 to 30 μm.

The electrode active material layer may have a thickness of 0 to 40 μm.

The electrode active material layer may be a lithium metal sheet or a lithium metal foil.

Further, the present disclosure provides a lithium secondary battery including the electrode.

Advantageous Effects

The electrode for a lithium secondary battery of the present disclosure maintains uniform heat distribution on a surface of the electrode during charging and discharging, so that lithium dendrites grow uniformly on the surface. Accordingly, the electrode of the present disclosure does not cause a problem of an increase in contact area between the electrode and an electrolyte by the non-uniform growth of the lithium dendrites, or a problem of peeling of the protective layer, thereby improving stability and lifetime characteristics when applied to the battery.

DETAILED DESCRIPTION OF THE EMBODIMENTS

Hereinafter, the present invention will be described in detail so as to be easily carried out by those skilled in the art. However, the present invention may be embodied in many different forms and should not be limited to the embodiments described herein.

The Electrode for a Lithium Secondary Battery

The present disclosure provides an electrode for a lithium secondary battery, including:
  a current collector;
  a protective layer; and
  optionally an electrode active material layer interposed between the current collector and the protective layer and containing lithium metal,
  wherein the protective layer contains a thermally conductive material having thermal conductivity of 25 to 500 W/m·K, and
  the thermally conductive material is contained in an amount of 50 wt % or more of a total weight of the protective layer.

The electrode for a lithium secondary battery according to the present disclosure includes a protective layer having excellent thermal conductivity on an electrode active material layer, so that the heat generated in the electrode due to continuous dissolution and precipitation of lithium metal during operation of the battery can be uniformly transferred to the entire surface of the electrode.

When heat distribution on the surface of the electrode is made uniform during the operation of the battery, the lithium dendrites also grow on the surface of electrode to a uniform extent. As a result, a change in volume of the electrode is significantly reduced, so that the protective layer does not peel off. In addition, problems of an increase in surface area of the electrode due to irregular growth of the lithium dendrites and an increase in side reactions with an electrolyte can be greatly improved. Therefore, the electrode of the present disclosure has improved stability and excellent lifetime characteristics as compared with conventional electrodes containing lithium metal.

In the present disclosure, the current collector is not particularly limited as long as it has electrical conductivity without causing a chemical change in the battery. For example, it may be copper; stainless steel; aluminum; nickel; titanium; sintered carbon; copper or stainless steel surface-treated with carbon, nickel, titanium, or silver; an aluminum-cadmium alloy; or the like. In addition, various forms such as a film, a sheet, a foil, a net, a porous body, a foam body, and a nonwoven fabric body with/without fine unevenness on its surface may be used.

The thickness of the current collector is not particularly limited, but is preferably 5 to 30 μm, and more preferably 10 to 20 μm. If the thickness of the current collector exceeds 30 μm, a capacity per unit volume of the electrode decreases. If the thickness of the collector is less than 5 μm, folding may occur during the production of the electrode.

The electrode active material layer is optionally included in the present disclosure. That is, the electrode of the present disclosure may include only the current collector and the protective layer without the electrode active material layer, or may include the current collector, the electrode active material layer, and the protective layer. At this time, the electrode active material layer may be interposed between the current collector and the protective layer, and may have a structure in which the current collector, the electrode active material layer, and the protective layer are sequentially laminated. In the case of the electrode having no electrode active material layer, an electrode active material layer may be formed during use of the battery, since lithium metal is plated between the current collector and the protective layer in the charging and discharging process after assembling the battery.

The electrode active material layer may include lithium metal as an active material, and may further include at least one selected from the group consisting of a lithium alloy, a lithium metal composite oxide, a lithium-containing titanium composite oxide (LTO), and combinations thereof. The lithium alloy includes an element that can be alloyed with lithium. Examples of the element may be Si, Sn, C, Pt, Ir, Ni, Cu, Ti, Na, K, Rb, Cs, Fr, Be, Mg, Ca, Sr, Sb, Pb, In, Zn, Ba, Ra, Ge, Al, and alloys thereof.

The electrode active material layer may preferably be lithium metal or a lithium alloy, and more preferably, a lithium metal sheet or foil.

The thickness of the electrode active material layer may be 0 to 40 μm, preferably 5 to 40 μm, and more preferably 10 to 20 μm.

The method for forming the electrode active material layer on the current collector is not particularly limited in the present disclosure, and methods known in the art can be used. For example, the electrode active material layer may be formed by depositing or coating lithium metal or a lithium alloy on the current collector by a dry or wet process, or by laminating the prepared lithium metal sheet or foil on the current collector.

The electrode for a lithium secondary battery of the present disclosure includes a protective layer containing a thermally conductive material for protecting the electrode active material layer and improving thermal distribution of the surface of the electrode to uniformly grow the lithium dendrites. The thermally conductive material may have thermal conductivity of 25 to 500 W/m·K, and preferably 100 to 500 W/m·K, or 120 to 500 W/m·K. Herein, the thermally conductive material is not particularly limited, but may be a thermally conductive ceramic.

Specifically, the thermally conductive material may be at least one selected from the group consisting of boron nitride (BN), magnesium oxide (MgO), aluminum oxide ($Al_2O_3$), beryllium oxide (BeO), aluminum nitride (AlN), steatite, and forsterite. The better the thermal conductivity of the thermally conductive ceramic is, the better the performance of the electrode becomes. Therefore, boron nitride (thermal conductivity of 120 W/m·K) or aluminum nitride (thermal conductivity of 180 W/m·K) can be more preferably used.

The protective layer may preferably contain 50 wt % or more of the thermally conductive material. When the protective layer contains less than 50 wt % of the thermally conductive material, heat distribution of the surface of the electrode during the operation of the battery is uneven and the lithium dendrites grow irregularly. As a result, problems of an increase in surface area of the electrode and an increase in side reactions with an electrolyte may occur. In order to secure the effect of the present disclosure, the thermally conductive material may be contained in an amount of 60 wt % or more, 70 wt % or more, 80 wt % or more, or 90 wt % or more of a total weight of the protective layer.

Although the particle size of the thermally conductive ceramic is not particularly limited, the thermally conductive ceramic may not be uniformly distributed on the protective layer when it is too large. When it is too small, intrinsic properties of the material may be defective. Therefore, the particle size may preferably be 0.1 to 10 μm, 0.1 to 3 μm, or 0.1 to 1 μm.

Meanwhile, the protective layer may include a binder resin in addition to the thermally conductive material. It is preferable that the binder resin can distribute the thermally conductive material evenly on the electrode active material layer and has good compatibility with the thermally conductive material. For example, polyvinylidene fluoride (PVDF), polyvinyl alcohol (PVA), polyacrylic acid (PAA), poly(methacrylic acid) (PMA), poly(methylmethacrylate) (PMMA), polyacrylamide (PAM), poly(methacrylamide), polyacrylonitrile (PAN), polymethacrylonitrile, polyimide (PI), or the like may be used. Among them, PVDF can preferably be used in consideration of binding force between the ceramics. The binder resin may be used in an amount of 50% or less of a total weight of the protective layer.

In the present disclosure, the thickness of the protective layer is not particularly limited, but may be 1 to 10 μm, and preferably 1 to 5 μm, in order to ensure an inhibiting effect of the lithium dendrite growth and to not increase internal resistance of the battery. When the thickness is less than the above range, it is not sufficient for performing functions as a protective layer. When the thickness exceeds the above range, interfacial resistance increases to cause deterioration of battery characteristics.

The method for forming the protective layer on the surface of the electrode active material layer containing lithium metal is not particularly limited, and methods commonly used in the art may be used without limitation depending on the material of the protective layer. For example, common methods of forming a layer such as a doctor blade method, a solution casting method, a dip coating method, a spray coating method, a spin coating method, a sputtering method of PVD (physical vapor deposition), and an ALD (atomic layer deposition) method of CVD (chemical vapor deposition) may be used.

The Lithium Secondary Battery

The present disclosure provides a lithium secondary battery including the electrode according to the present invention as a negative electrode.

The electrode for a lithium secondary battery according to the present disclosure maintains uniform heat distribution on the surface, so that lithium dendrites grow uniformly.

Accordingly, the electrode of the present disclosure has a smaller change in volume than that of conventional electrodes, the protective layer does not easily peel off, and problems caused by side reactions with an electrolyte are remarkably reduced, thereby improving safety and cycle characteristics when the electrode is applied to the lithium secondary battery.

Configurations of a positive electrode, a separator, and an electrolyte included in the lithium secondary battery are not particularly limited in the present invention, and any of those that are well-known in the art can be applied.

(1) The Positive Electrode

The positive electrode includes a positive electrode active material formed on the positive electrode current collector.

The positive electrode current collector is not particularly limited as long as it has high electrical conductivity without causing chemical changes in the battery. For example, it may be stainless steel; aluminum; nickel; titanium; sintered carbon; aluminum or stainless steel surface-treated with carbon, nickel, titanium, or silver; or the like. Herein, various forms such as a film, a sheet, a foil, a net, a porous body, a foam body, and a nonwoven fabric body with fine unevenness on its surface may be used in order to increase adhesive force with the positive electrode active material.

As the positive electrode active material constituting the electrode layer, all of the positive electrode active materials available in the art can be used. Specific examples of the positive electrode active material include lithium metal; a lithium cobalt-based oxide such as $LiCoO_2$; a lithium manganese-based oxide such as $Li_{1+x}Mn_{2-x}O_4$ (wherein x is 0 to 0.33), $LiMnO_3$, $LiMn_2O_3$, and $LiMnO_2$; a lithium copper-based oxide such as $Li_2CuO_2$; a vanadium oxide such as $LiV_3O_8$, $LiFe_3O_4$, $V_2O_5$, and $Cu_2V_2O_7$; a lithium nickel-based oxide such as $LiNi_{1-x}M_xO_2$ (wherein M=Co, Mn, Al, Cu, Fe, Mg, B, or Ga, x=0.01 to 0.3); a lithium manganese-based composite oxide such as $LiMn_{2-x}M_xO_2$ (wherein M=Co, Ni, Fe, Cr, Zn, or Ta, x=0.01 to 0.1), and $Li_2Mn_3MO_8$ (wherein M=Fe, Co, Ni, Cu, or Zn); a lithium-nickel-manganese-cobalt-based oxide such as $Li(Ni_aCo_bMn_c)O_2$ (wherein 0<a<1, 0<b<1, 0<c<1, a+b+c=1); a vanadium oxide such as $LiV_3O_8$, $LiFe_3O_4$, $V_2O_5$, and $Cu_2V_2O_7$; a sulfur or disulfide compound; a phosphate such as $LiFePO_4$, $LiMnPO_4$, $LiCoPO_4$, and $LiNiPO_4$; $Fe_2(MoO_4)_3$; and the like, but the present disclosure is not limited thereto.

Herein, the electrode layer may further include a binder resin, a conductive material, a filler, and other additives in addition to the positive electrode active material.

The binder resin is used to assist in binding between the electrode active material and the conductive material, and in binding to the current collector. Examples of the binder resin include polyvinylidene fluoride (PVDF), polyvinyl alcohol (PVA), polyacrylic acid (PAA), poly(methacrylic acid) (PMA), poly(methylmethacrylate) (PMMA), polyacrylamide (PAM), poly(methacrylamide), polyacrylonitrile (PAN), polymethacrylonitrile, polyimide (PI), alginic acid, alginate, chitosan, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), sulfonated-EPDM, styrene-butadiene rubber (SBR), fluorine rubber, and various copolymers thereof.

The conductive material is used to further improve conductivity of the electrode active material. The conductive material is not particularly limited as long as it has electrical conductivity without causing chemical changes in the battery. Examples of the conductive material include graphite such as natural graphite or artificial graphite; carbon blacks such as carbon black, acetylene black, ketjen black, channel black, furnace black, lamp black, and thermal black; conductive fibers such as a carbon fiber and a metallic fiber; metallic powders such as carbon fluoride powder, aluminum powder, and nickel powder; conductive whiskers such as zinc oxide and potassium titanate; conductive metal oxides such as titanium oxide; polyphenylene derivatives; and the like.

The filler is optionally used as a component to inhibit expansion of the electrode. The filler is not particularly limited as long as it is a fibrous material that does not cause chemical changes in the battery. For example, olefin-based polymers such as polyethylene and polypropylene and fibrous materials such as glass fiber and carbon fiber can be used.

(2) The Separator

The lithium secondary battery according to the present disclosure may include a separator interposed between the positive electrode and the negative electrode.

The separator may be formed of a porous substrate, and any porous substrate commonly used in an electrochemical device can be used. For example, a polyolefin-based porous film or a nonwoven fabric may be used, but it is not particularly limited thereto.

The separator may be a porous substrate composed of any one selected from the group consisting of polyethylene, polypropylene, polybutylene, polypentene, polyethylene terephthalate, polybutylene terephthalate, polyester, polyacetal, polyamide, polycarbonate, polyimide, polyetheretherketone, polyether sulfone, polyphenylene oxide, polyphenylene sulfide, and polyethylene naphthalate, or a mixture of two or more thereof.

(3) The Electrolyte

The electrolyte of the lithium secondary battery according to the present disclosure may be a non-aqueous electrolyte containing a non-aqueous organic solvent and a lithium salt, an organic solid electrolyte, or an inorganic solid electrolyte, but is not limited thereto.

Examples of the non-aqueous organic solvent include non-aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxy ethane, 1,2-diethoxy ethane, tetrahydroxy franc, 2-methyl tetrahydrofuran, dimethyl sulfoxide, 1,3-dioxolane, 4-methyl-1,3-dioxane, diethyl ether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

The lithium salt is a material that is readily soluble in the non-aqueous electrolyte, and examples thereof include LiCl, LiBr, LiI, $LiClO_4$, $LiBF_4$, $LiB_{10}Cl_{10}$, $LiPF_6$, $LiAsF_6$, $LiSbF_6$, $LiAlCl_4$, LiSCN, $LiC_4BO_8$, $LiCF_3CO_2$, $LiCH_3SO_3$, $LiCF_3SO_3$, $LiN(SO_2CF_3)_2$, $LiN(SO_2C_2F_5)_2$, $LiC_4F_9SO_3$, $LiC(CF_3SO_2)_3$, $(CF_3SO_2)_2NLi$, chloroborane lithium, lower aliphatic carboxylic acid lithium, lithium tetraphenyl borate, lithium imide, and the like.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, polymers containing a secondary dissociation group, and the like.

Examples of the inorganic solid electrolyte include nitrides, halides, and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like.

In addition, the electrolyte may further include other additives in order to improve charge/discharge characteristics and flame retardancy, and the like. Examples of the additive include pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, fluoroethylene carbonate (FEC), propene sultone (PRS), vinylene carbonate (VC), and the like.

The lithium secondary battery according to the present disclosure can be subjected to a lamination or stack process of the separator and electrode, and a folding process in addition to winding, which is a general process. Further, the battery case may have a cylindrical shape, a square shape, a pouch shape, or a coin shape.

Hereinafter, the present invention will be described in more detail with reference to the following preferred examples, but these examples are provided for illustrative purposes only. It is apparent to those skilled in the art that various changes and modifications can be made within the scope and spirit of the present invention. Therefore, it is obvious that the changes and modifications are within the scope of the present invention.

EXAMPLES

Example 1

(1) Preparation of an Electrode Including a Protective Layer Containing a Thermally Conductive Material An electrode with a protective layer containing boron nitride (BN) having a particle size of 3 μm as a thermally conductive material was prepared in the following manner.

A BN/PVDF/NMP solution (a composition for forming a protective layer) was prepared by mixing 500 ml of a PVDF (polyvinylidene fluoride)/NMP (N-methyl pyrrolidone) solution and 500 ml of a BN/NMP solution. Herein, a weight ratio of BN:PVDF of the composition for forming a protective layer was 9:1.

The composition for forming a protective layer was coated on a lithium metal electrode in which a lithium metal foil having a thickness of 20 μm was laminated on a copper foil having a thickness of 20 μm by using a doctor blade, and then dried to form a protective layer having a thickness of 2 μm (90 wt % of BN, 10 wt % of PVDF).

(2) Preparation of a Lithium Secondary Battery

A lithium secondary battery was prepared by using the electrode of the above (1) as a negative electrode in the following manner.

96 g of $LiCoO_2$, 2 g of PVDF, and 2 g of carbon black were added to 100 ml of N-methylpyrrolidone to prepare a slurry. The slurry was applied to an aluminum foil having a thickness of 15 μm and dried at about 130° C. for 2 hours to prepare a positive electrode.

A solution prepared by dissolving 1 M $NaPF_6$ in an organic solvent composed of ethylene carbonate (EC): ethyl methyl carbonate (EMC) (mixing volume ratio=1:1) was used as an electrolyte.

A lithium secondary battery was prepared by preparing an electrode assembly by interposing a porous polyethylene separator having a thickness of 15 μm between the positive electrode and the negative electrode, placing the electrode assembly in a case, and injecting the electrolyte.

Example 2

An electrode for a lithium secondary battery and a lithium secondary battery including the same as a negative electrode were prepared in the same manner as in Example 1, except that the weight ratio of BN:PVDF of the composition for forming a protective layer was 8:2.

Example 3

An electrode for a lithium secondary battery and a lithium secondary battery including the same as a negative electrode were prepared in the same manner as in Example 1, except that the weight ratio of BN:PVDF of the composition for forming a protective layer was 7:3.

Example 4

An electrode for a lithium secondary battery and a lithium secondary battery including the same as a negative electrode were prepared in the same manner as in Example 1, except that the weight ratio of BN:PVDF of the composition for forming a protective layer was 6:4.

Example 5

An electrode for a lithium secondary battery and a lithium secondary battery including the same as a negative electrode were prepared in the same manner as in Example 1, except that the weight ratio of BN:PVDF of the composition for forming a protective layer was 5:5.

Comparative Example 1

An electrode for a lithium secondary battery and a lithium secondary battery including the same as a negative electrode were prepared in the same manner as in Example 1, except that the thermally conductive material was not added during the preparation of the composition for forming a protective layer.

Comparative Example 2

An electrode for a lithium secondary battery and a lithium secondary battery including the same as a negative electrode were prepared in the same manner as in Example 1, except that the weight ratio of BN:PVDF of the composition for forming a protective layer was 3:7.

Comparative Example 3

An electrode for a lithium secondary battery and a lithium secondary battery including the same as a negative electrode were prepared in the same manner as in Example 1, except that an ion conductive ceramic LLZO ($Li_7La_3Zr_2O_{12}$, thermal conductivity of less than 25 W/m·K) used for a general protective layer was used instead of the thermally conductive ceramic during the preparation of the composition for forming a protective layer, and the weight ratio of LLZO:PVDF was 9:1.

Experimental Example 1

Evaluation of Battery Performance

Cycles were performed for each of the batteries of the above-described examples and comparative examples under the following conditions, and the battery performance was evaluated. The results are shown in Table 1 below.

Charging: Rate 0.3 C, Voltage 4.25 V, CC/CV (5% current cut at 1 C)

Discharging: Rate 0.5 C, Voltage 3 V, CC

TABLE 1

| | Capacity Retention (%) | |
|---|---|---|
| | 50th cycle | 100th cycle |
| Example 1 | 98 | 96 |
| Example 2 | 95 | 90 |
| Example 3 | 90 | 80 |
| Example 4 | 85 | 70 |
| Example 5 | 80 | 60 |
| Comparative Example 1 | 60 | 20 |
| Comparative Example 2 | 65 | 23 |
| Comparative Example 3 | 72 | 50 |

Referring to Table 1, it was confirmed that Examples 1 to 5 in which BN is contained in the protective layer at 50 wt % (weight ratio of BN:PVDF of the composition for a forming protective layer=1:1) or more as a thermal conductive material have improved capacity retention ratios with respect to the cycle of the battery as compared with Comparative Example 1 including no protective layer and Comparative Example 2 containing 30 wt % of the thermally conductive material in the protective layer. In addition, Comparative Example 3 using the LLZO ceramic has a better lifetime improving effect as compared with Comparative Example 1 in which the protective layer was not applied, but could not achieve the improving effect of cycle characteristics as compared with the protective layer using the thermally conductive ceramic (Examples 1 to 5). That is, it can be confirmed that the thermally conductive ceramic has a greater lifetime improving effect than the ion conductive ceramic.

Experimental Example 2

Evaluation of Change in Thickness of Electrode

The batteries of the examples and comparative examples which had undergone the charging and discharging of Experimental Example 1 were decomposed to observe the change in thickness of the negative electrode. The results are shown in Table 2 below.

TABLE 2

| | Thickness of electrode (um) 100th cycle |
|---|---|
| Example 1 | 70 |
| Example 2 | 75 |
| Example 3 | 80 |
| Example 4 | 90 |
| Example 5 | 100 |
| Comparative Example 1 | 170 |
| Comparative Example 2 | 160 |
| Comparative Example 3 | 115 |

Referring to Table 2, it was confirmed that Examples 1 to 5 in which BN is contained in the protective layer at 50 wt % (weight ratio of BN:PVDF of the composition for a forming protective layer=1:1) or more as a thermal conductive material can suppress the electrode from being thickened by the lithium dendrite growth as compared with Comparative Example 1 including no protective layer, Comparative Example 2 containing 30 wt % of the thermally conductive material in the protective layer, and Comparative Example 3 using the common ion conductive ceramic.

All simple modifications and variations of the present invention are within the scope of the present invention, and the specific scope of protection of the present invention will be clarified by the claims.

The invention claimed is:

1. An electrode for a lithium secondary battery, comprising:
    a current collector;
    a protective layer; and
    an electrode active material layer interposed between the current collector and the protective layer and consisting of lithium metal,
    wherein the electrode active material layer has a thickness of greater than 0 to 20 μm or less,
    wherein the protective layer comprises boron nitride as a thermally conductive material having a thermal conductivity of 25 to 500 W/m·K,
    the boron nitride is contained in an amount of 50 wt % or more based on a total weight of the protective layer.

2. The electrode for the lithium secondary battery of claim 1, wherein the thermally conductive material is comprised of particles having a particle size of 0.1 to 10 μm.

3. The electrode for the lithium secondary battery of claim 1, wherein the protective layer contains 70 wt % or more of the thermally conductive material.

4. The electrode for the lithium secondary battery of claim 1, wherein the protective layer comprises at least one binder resin selected from the group consisting of polyvinylidene fluoride (PVDF), polyvinyl alcohol (PVA), polyacrylic acid (PAA), poly(methacrylic acid) (PMA), poly(methylmethacrylate) (PMMA), polyacrylamide (PAM), poly(methacrylamide), polyacrylonitrile (PAN), polymethacrylonitrile, and polyimide (PI).

5. The electrode for the lithium secondary battery of claim 1, wherein the protective layer has a thickness of 1 to 10 μm.

6. The electrode for the lithium secondary battery of claim 1, wherein the current collector has a thickness of 5 to 30 μm.

7. The electrode for the lithium secondary battery of claim 1, wherein the electrode active material layer is a lithium metal sheet or a lithium metal foil.

8. A lithium secondary battery, which comprises the electrode according to claim 1.

9. An electrode for a lithium secondary battery, comprising:
    a current collector;
    a protective layer; and
    an electrode active material layer interposed between the current collector and the protective layer and consisting of lithium metal,
    wherein the electrode active material layer has a thickness of 0 to 20 μm,
    wherein the protective layer comprises boron nitride as a thermally conductive material having a thermal conductivity of 25 to 500 W/m·K,
    wherein the protective layer comprises polyvinylidene fluoride (PVDF) as a binder resin, and
    the boron nitride is contained in an amount of 50 wt % or more based on a total weight of the protective layer.

* * * * *